United States Patent Office 3,510,661
Patented May 5, 1970

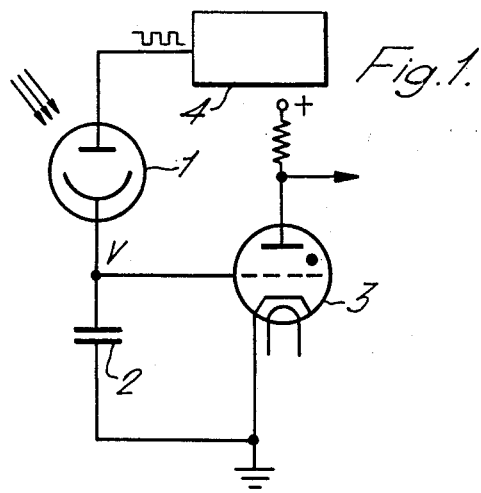
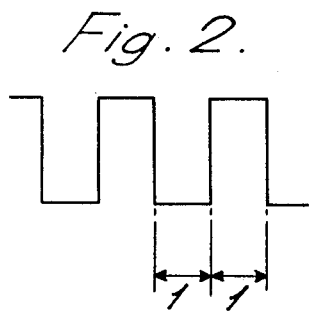
Fig. 1.
Fig. 2.
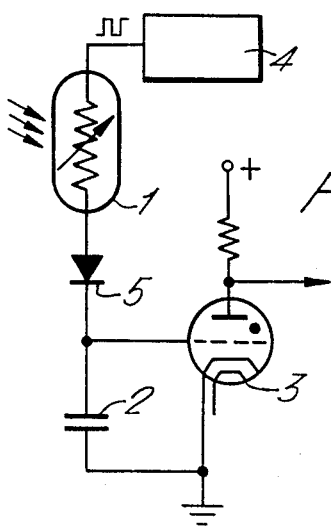
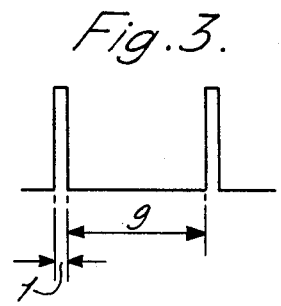
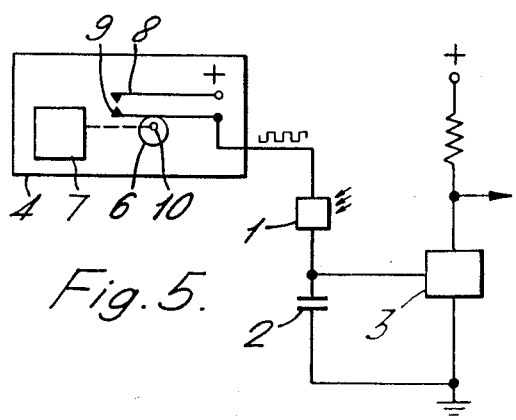
Fig. 3.
Fig. 4.
Fig. 5.

3,510,661
PHOTOELECTRIC TIMING CONTROL APPARATUS
Keith Aston, 127 Marlow Drive, North Cheam, England
Filed Dec. 5, 1967, Ser. No. 688,252
Claims priority, application Great Britain, Dec. 5, 1966,
54,404/66
Int. Cl. H01j 39/12
U.S. Cl. 250—214                                                11 Claims

ABSTRACT OF THE DISCLOSURE

Photoelectric timing control apparatus for controlling the amount of light provided by a light source includes a photelectric device adapted to charge a timing capacitor at a rate dependent upon the intensity of the light source. An operating voltage is applied periodically to the photoelectric device to render it alternatively operative and inoperative, with the ratio of operative to inoperative periods determining the charging rate of the capacitor, and permitting a wide range of control.

This invention relates to an improved photoelectric timing control apparatus in or for photographic printers or enlargers and in particular relates to a photoelectric timing control circuit i.e. a circuit including a photoelectric device, for controlling the exposure timing sequences in photographic colour printers or enlargers.

It is to be understood that the term "photoelectric device" as used herein is intended to include any device which exhibits the photoelectric effect in response to incident luminous energy. Thus the photoelectric device may be of the photoconductive, photovoltaic or photoemissive types for example including semiconductor and solid state devices.

In photographic colour printing as with black-and-white printing it is necessary to control very precisely the intervals during which the negative to be printed is exposed to the exposing light beam. When the printing process is used in which separately timed exposures are made for each component colour image of the negative, the exposures taking place sequentially or concurrently, the relative durations of each of the separate exposures must be accurately controlled in order ot obtain the correct colour balance in the print, and when printing from an underexposed or overexposed negative it is necessary that the action of the timing control circuit can be readily and accurately modified to correct for the abnormally exposed negative.

In a conventional photoelectric timing control circuit for photographic printers or enlargers, a photoelectric device serves to control the rate of charging of a timing capacitor, according to the luminous flux incident upon the device, to a certain critical potential whereupon a trigger circuit is fired. Thus in making an exposure the amount of light from the illuminated negative incident upon the photographic plate or printing material is monitored by the photoelectric device and after a predetermined exposure interval the trigger circuit is fired to terminate the exposure.

In order to provide for modification of the exposure intervals as determined by such conventional photoelectric timing control circuits three factors may be varied.

(i) A variable bias voltage may be applied to a photocell so that it operates on a different part of its current/voltage characteristic thereby to control the magnitude of the charge flow in the photocell in response to a unit of luminous flux and so control the rate of charging of the capacitor.

(ii) The value of the capacitor may be varied.

(iii) The trigger circuit may be biased "off" by the application of a further variable bias voltage thereby rendering variable the critical potential at which the trigger circuit fires.

It is generally required in photographic colour printers to provide several calibrated controls for modifying the action of the photoelectic timing control circuits which controls operate quite independently of one another. For example the range of modification effected by a particular control and the significance of its scale calibrations should not be affected when another control is operated to modify the same timing circuit. Four typical reasons for requiring to modify the action of the photoelectric control circuits are given below;

(a) In order take account of the speed of the printing material employed.

(b) So that the operator can adjust manually to bias the exposure times when printing abnormal negatives, e.g. underexposed or overexposed negatives.

(c) To take account of lens apertures etc. to compensate for variation of the ratio of light incident upon the photoelectric device to light incident upon the printing plate or material.

(d) To provide for automatic correction during exposure so as to provide selective modification of the exposure of overexposed and underexposed negatives.

It has been found that the three factors previously discussed herein for varying the exposure intervals are inadequate to provide the necessary range of independent variation. Thus it is not always practical to vary the bias votlage of a photocell to change the charge flow in the photocell in response to unit luminous flux incident thereupon and the characteristics of many commercially available photocells are not conductive to this kind of variation. The value of the charging capacitor can be discontinuously changed by switching to a component of another value or continuously changed by using continuously variable capacitors which generally speaking are unsuitable, moreover the switching of capacitors involves the use of costly low-leakage components owing to the generally high impedance of the trigger circuits. It is difficult to provide more than one or two independent controls for varying the critical potential at which the trigger circuit fires and also the range of adjustment afforded in this way is very much limited both by the value of the capacitor and the characteristics of the trigger circuit.

It is therefore the object of the present invention to provide an improved photoelectric timing control apparatus for photographic printers or enlargers which provides a further control facility which is independent of those mentioned above.

According to the present invention therefore there is provided photoelectric timing control apparatus in or for photographic printing or enlarging apparatus, said timing control apparatus including a photoelectric device which serves to control the rate of charging of a timing capacitor according to the luminous flux incident upon the device and switch means for rendering the photoelectric device alternatively inoperative and operative such that when the device is inoperative the charging of said capacitor is interrupted, said switch means being that the ratio of time intervals during which the photocell is inoperative and operative is variable.

Thus in any particular interval by providing that the photoelectric device is inoperative for part and operative for the remainder of the interval and by providing that the ratio of the operative to the inoperative parts of the interval is variable it is arranged that the average chargeing rate of the capacitor is adjustable.

According to a further aspect of the present invention there is provided in or for a photographic colour printing or enlarging apparatus for printing by the additive process at least two independent photoelectric timing control apparatuses, each said timing control apparatus including a photoelectric device which serves to control the rate of charging of a timing capacitor according to the luminous flux incident upon the device and switch means for rendering the photoelectric device alternately inoperative and operative such that when the device is inoperative the charging of said capacitor is interrupted, said switch means being such that the ratio of time intervals during which the photocell is inoperative and operative is adjustable.

Preferably said switch means consists of a waveform generator such as a multivibrator circuit which generates a voltage waveform in the form of a rectangular wave having two voltage states, the said rectangular waveform being applied to the photoelectric device as a supply voltage, the photoelectric device being rendered operative in one of said two voltage states and inoperative in the other voltage state, the mark to space ratio of said two voltage states being continuously variable by variation of the generator or multivibrator time constants. Alternatively the rectangular waveform may be produced by mechanical means, a cam driven by an electric motor serving to open and close a pair of contacts by moving one contact relative to the other and variation of the relative durations of the contacts-open and contacts-closed being effected by variations of the distance between the fixed contact and the cam axis. Apparatuses for generating a rectangular voltage waveform are well known per se and will not be discussed in detail herein.

In order that the invention might be more clearly understood a description will now be given by way of example only of a simple embodiment of the invention with reference to the accompanying drawings wherein:

FIG. 1 shows a simple embodiment of photoelectric timing control apparatus according to this invention, FIG. 2 shows a first rectangular voltage waveform having a mark: space ratio of 1:1, FIG. 3 shows a second rectangular voltage waveform having a mark: space ratio of 1:9, FIG. 4 shows a second simple embodiment of photoelectric timing control apparatus according to this invention, FIG. 5 illustrates diagrammatically a mechanical arrangement for generating a rectangular voltage waveform in the apparatus of FIG. 1 or FIG. 2.

In FIG. 1 there is shown diagrammatically a photoelectric timing control apparatus in which charge flow in a photocell 1 due to luminous energy incident thereupon serves to charge a capacitor 2 to a critical voltage $Vd$ at which a trigger or detector circuit 3 (shown in FIG. 1 as a thyratron) is fired. Control of the circuit of FIG. 1 may be effected as previously described herein in three ways, by varying the anode potential $Va$ of the photocell 1, by varying the value of the capacitor 2 and by varying the critical potential at which thhe thyratron 3 fires.

In accordance with a preferred arrangement of the present invention switch means 4 are provided, in the form of a multivibrator circuit for example, for applying a rectangular voltage waveform to the anode of the photocell 1 shown in FIG. 1 to render it alternatively operative and inoperative. The positive excursions of the rectangular voltage waveform provide the normal operating anode voltage $Va$ of the photocell 1 and the negative excursions of the rectangular voltage waveform bias the photocell 1 into its inoperative condition in which no charge flows to the capacitor 2. It is clear that in this way the total charge flow through the photocell 1 over any interval depends upon the ratio of the part of that interval during which the photocell 1 is operative to the remainder of the interval during which the photocell 1 is inoperative. For example a voltage waveform as shown in FIG. 2 when applied to the anode of the photocell 1 of FIG. 1 will cause the capacitor 2 to take twice as long to charge to the critical potential at which the thyratron 3 fires as compared with a D.C. voltage applied to the anode of the photocell 1. A voltage waveform as shown in FIG. 3 will cause the capacitor 2 to take ten times as long to charge to the critical potential at which the thyratron 3 fires as compared with a constant D.C. anode voltage.

The amplitude of the negative excursion of the rectangular voltage waveform which is applied during the "OFF" portion of the waveform is not critical, provided it is sufficient to prevent any charging of the capacitor 2 from taking place. It is clear that an inverse voltage may be applied to the photocell 1 during this period. This does not matter in the case of a vacuum photocell which does not conduct appreciably in the reverse directions, but, in the case of a photoresistor and other types of photoelectric device, it is desirable to insert a rectifying diode 5 in the apparatus as shown in FIG. 4. This will prevent the capacitor 2 discharging back through the photoelectric device 1 during the negative excursion of the waveform supplied by switch means 4 so that the photoelectric device 1 is effectively isolated and can be regarded as out of circuit during this part of the waveform.

The term "positive" and "negative" in the foregoing descriptions apply to the arrangement shown in FIGS. 1 and 4. Where the charging of the timing capacitor has been arranged to take place in a negative-going direction, the foregoing discussion will apply, but with the polarities reversed.

The frequency of the rectangular waveform is of little significance, provided it is sufficiently high to ensure that several complete cycles of the rectangular voltage waveform will take place during the shortest time intervals encountered in practice. This will minimise errors due to the precise position in a waveform at which an exposure happens to commence or terminate. For normal exposure times encountered in a photographic printer, a waveform frequency of say, 100 cycles per second is likely to be convenient, and it can for example be produced from the main waveform by reshaping the normal sine wave, or alternatively it may be produced quite independently by means of an oscillator or waveform generator. Such waveform generating systems are too varied and too well known per se to require any description here, other than that the system must provide for deliberate alteration of the mark to space ratio of the waveform and this ratio should be stable against accidential drift or fluctuation.

The rectangular voltage waveform may also be produced by mechanical means consisting for example of contacts which are opened and closed rapidly so as to interrupt the anode D.C. supply. In FIG. 5 there is shown a cam 6 which is rapidly rotated by a motor 7 to open and close contacts 8 and 9, the "ON" to "OFF" ratio of the contacts can be changed by moving contact 8 nearer to or further from the cam axis 10. Such mechanical methods are not likely to prove reliable over long periods of operation, however, neither are they particularly easy to incorporate into the particular methods of exposure compensation described below.

The invention as described may be used for any of the controls of a photographic printer or enlarger which require a modification of the action of the photoelectric control circuit to be made. However, a particular application is as follows:

A photographic printer is usually adjusted so as to give good prints when printing from average negatives. When printing from negatives which are much lighter or much denser than average, it often happens that the resulting prints could be improved by "biassing" the printer to give more (or less) exposure than the simple conventional timing circuits would indicate. This can be accomplished by means of the present invention by modifying the waveform as previously described whilst the exposure proceeds. This modification may either occur gradually, during the progress of the exposure, or it may take place in one or more "steps" at predetermined times during the course of the exposure.

The following example will show how the printing of a heavy negative can be modified. A normal negative exposes in, say 1 second, and a heavy negative exposes in, say 4 seconds, using conventional circuits. If now according to the present invention the waveform is modified after 1 second (or a little over) so as to reduce the "ON" period of the waveform to half its previous value, no change will occur to the printing of normal negatives, as the exposure is completed before the modifying means operates. All times in excess of 1 second, however, will be doubled, so that the dark negative will now be given an exposure of 7 seconds instead of 4 seconds.

Similarly it can be shown that if the "ON" to "OFF" ratio of waveform is modified after a very short time, corresponding approximately to the printing exposure for a light (underexposed) negative, the printing time for such a negative can be substantially modified relative to the printing time for a normal negative.

The amount of alteration produced, and the precise way in which it affects the final results can be infinitely varied by controlling:

(1) The amount or amounts by which the "ON" to "OFF" ratio of the waveform is modified.

(2) The time interval (or intervals) during exposure which occurs before such modification(s) are made.

(3) The rapidity with which the "ON" to "OFF" ratio of the waveform is modified, if it is changed gradually over a period of time, and not in sudden steps. Combinations of all these methods, can of course, be employed.

The changes of waveform referred to may be brought about automatically by the printing machine without attention from the operator, but means may be provided to preset the amount of the bias which is introduced, the optimum settings usually being determined by practical trials with typical negatives of various types.

I claim:

1. Photoelectric timing control apparatus in or for photographic printing or enlarging apparatus, said timing control apparatus including a photoelectric device which serves to control the rate of charging of a timing capacitor according to he luminous flux incident upon the device and switch means for rendering the photoelectric device alternately inoperative and operative such that when the device is inoperative the charging of said capacitor is interrupted, said switch means being such that the ratio of time intervals during which the photoelectric device is inoperative and operative is adjustable.

2. In or for a photographic colour printing or enlarging apparatus for printing by the additive process at least two independent photoelectric timing control aparatuses, each said timing control apparatus including a photoelectric device which serves to control the rate of charging of a timing capacitor according to the luminous flux incident upon the device and switch means for rendering the photoelectric device alternately inoperative and operative such that when the device is inoperative the charging of said capacitor is interrupted, said switch means being such that the ratio of time intervals during which the photocell is inoperative and operative is adjustable.

3. Apparatus as claimed in claim 1 wherein said switch means includes a waveform generator for generating a voltage waveform in the form of a rectangular wave which switches between two voltage states so that with said rectangular waveform applied to the photoelectric device as a supply voltage the photoelectric device is rendered operative in one of said two voltage states and inoperative in the other voltage state, and means are provided for adjusting the relative durations of said two voltage states.

4. Apparatus as claimed in claim 3 wherein said waveform generator is a multivibrator circuit.

5. Apparatus as claimed in claim 3 wherein said waveform generator includes a cam arranged for rotation by an electric motor to open and close a pair of contacts by moving one contact relative to the other, the distance between said other contact and the cam axis being adjustable.

6. Apparatus as claimed in claim 2 wherein said switch means includes a waveform generator for generating a voltage waveform in the form of a rectangular wave which switches between two voltage states so that with said rectangular waveform applied to the photoelectric device as a supply voltage, the photoelectric device is rendered operative in one of said two voltage states and inoperative in the other voltage state, and means are provided for adjusting the relative durations of said two voltage states.

7. Apparatus as claimed in claim 6 wherein said waveform generator is a multivibrator circuit.

8. Apparatus as claimed in claim 6 wherein said waveform generator includes a cam arranged for rotation by an electric motor to open and close a pair of contacts by moving one contact relative to the other, the distance between said other contact and the cam axis being adjustable.

9. Apparatus for use in controlling the amount of light provided by a light source, comprising photoelectric means for producing an electrical signal in response to said light source, said photoelectric means being operable when an operating voltage is applied thereto and inoperable when said operating voltage is removed therefrom, capacitor means connected in circuit with said photoelectric means and adapted to be charged to a voltage proportional to the intensity of the light impinging upon said photoelectric means when said photoelectric means is operable, and means for periodically applying said operating voltage to said photoelectric means, the ratio of the time during which said operating voltage is applied to said photoelectric means to the time during which said operating voltage is not applied to said photoelectric means determining the rate at which said capacitor means is charged for any given light intensity.

10. Apparatus according to claim 9, including means for varying the length of time during which said operating voltage is applied to said photoelectric means to vary said ratio and thereby adjust the charging rate of said capacitor means.

11. Apparatus according to claim 10, including output means for sensing when the voltage across said capacitor means reaches a preselected level.

References Cited

UNITED STATES PATENTS 3,008,053 11/1961 Hendee _____ 250—203
3,178,999 4/1965 Clapp _____ 250—207

RALPH G. NILSON, Primary Examiner

M. ABRAMSON, Assistant Examiner

U.S. Cl. X.R.

250—206, 207, 219; 307—246, 247